United States Patent
Coffman

(10) Patent No.: US 11,110,831 B2
(45) Date of Patent: Sep. 7, 2021

(54) FORCE ABSORBING VEHICLE SEAT MOUNTING SYSTEM

(71) Applicant: Scott Coffman, Visalia, CA (US)

(72) Inventor: Scott Coffman, Visalia, CA (US)

( * ) Notice: Subject to any disclaimer, the term of this patent is extended or adjusted under 35 U.S.C. 154(b) by 0 days.

(21) Appl. No.: 16/795,070

(22) Filed: Feb. 19, 2020

(65) Prior Publication Data

US 2020/0269734 A1 Aug. 27, 2020

Related U.S. Application Data

(60) Provisional application No. 62/810,147, filed on Feb. 25, 2019.

(51) Int. Cl.
| | |
|---|---|
| *B60N 2/427* | (2006.01) |
| *B60N 2/42* | (2006.01) |
| *B60N 2/015* | (2006.01) |
| *B60N 2/07* | (2006.01) |
| *B60N 2/12* | (2006.01) |
| *B60N 2/68* | (2006.01) |

(52) U.S. Cl.
CPC ............ *B60N 2/427* (2013.01); *B60N 2/015* (2013.01); *B60N 2/0717* (2013.01); *B60N 2/12* (2013.01); *B60N 2/4242* (2013.01); *B60N 2/68* (2013.01)

(58) Field of Classification Search
CPC .... B60N 2/4249; B60N 2/42709; B60N 2/42; B60N 2/542; B60N 2/4242; B64D 11/0619
See application file for complete search history.

(56) References Cited

U.S. PATENT DOCUMENTS

| | | | | |
|---|---|---|---|---|
| 2,401,748 A | * | 6/1946 | Dillon ................ | B64D 11/0619 244/122 B |
| 3,985,388 A | * | 10/1976 | Hogan ................... | B60N 2/163 297/216.17 |
| 4,204,659 A | * | 5/1980 | Phillips .................. | B64D 25/04 188/376 |
| 4,474,347 A | * | 10/1984 | Mazelsky ............ | B60N 2/4242 188/371 |
| 5,657,950 A | * | 8/1997 | Han ....................... | B64D 11/06 244/122 R |
| 5,699,984 A | * | 12/1997 | Pinault ................... | B64D 11/06 188/371 |

(Continued)

FOREIGN PATENT DOCUMENTS

| | | | | |
|---|---|---|---|---|
| GB | 625717 A | * | 7/1949 | ............. B60N 2/522 |
| GB | 860841 A | * | 2/1961 | ........... B64D 11/064 |

*Primary Examiner* — Timothy J Brindley
(74) *Attorney, Agent, or Firm* — Maginot, Moore & Beck LLP

(57) ABSTRACT

A vehicle seat mounting system for mounting a vehicle seat to a vehicle chassis includes a first mounting arrangement with a first chassis attachment portion configured to fixedly connect to the vehicle chassis and a first seat attachment portion configured to fixedly connect to the vehicle seat. The first seat attachment portion is movable relative to the first chassis portion in at least one direction. The first mounting arrangement further includes a compressible member interposed between the first chassis attachment portion and the first seat attachment portion. The compressible member is configured to absorb impact forces between the vehicle chassis and the vehicle seat.

20 Claims, 8 Drawing Sheets

(56) References Cited

U.S. PATENT DOCUMENTS

| | | | | |
|---|---|---|---|---|
| 5,758,859 A | * | 6/1998 | Gonzalez | B60N 2/4235 |
| | | | | 248/420 |
| 8,087,723 B2 | * | 1/2012 | Honnorat | B60N 2/4242 |
| | | | | 297/216.17 |
| 9,456,694 B2 | * | 10/2016 | Paul | B60N 2/544 |
| 2010/0219667 A1 | * | 9/2010 | Merrill | B60R 22/195 |
| | | | | 297/216.17 |
| 2014/0339866 A1 | * | 11/2014 | Olivares | B60N 2/24 |
| | | | | 297/216.17 |
| 2015/0217664 A1 | * | 8/2015 | Levin | B60N 2/24 |
| | | | | 180/329 |
| 2015/0300785 A1 | * | 10/2015 | Lamparter | B60N 2/643 |
| | | | | 297/216.17 |
| 2016/0207430 A1 | * | 7/2016 | Haller | B60N 2/0232 |
| 2016/0311446 A1 | * | 10/2016 | Haller | B60N 2/505 |
| 2017/0320411 A1 | * | 11/2017 | Mani | B60N 2/24 |
| 2018/0022243 A1 | * | 1/2018 | Iyer | B60N 2/06 |
| | | | | 297/216.1 |

\* cited by examiner

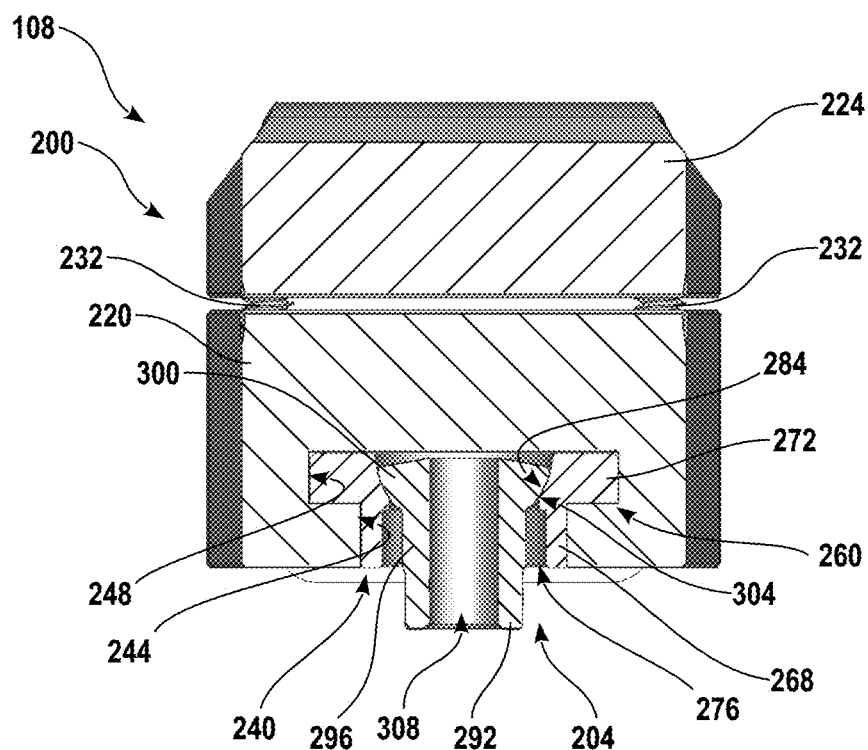
FIG. 6
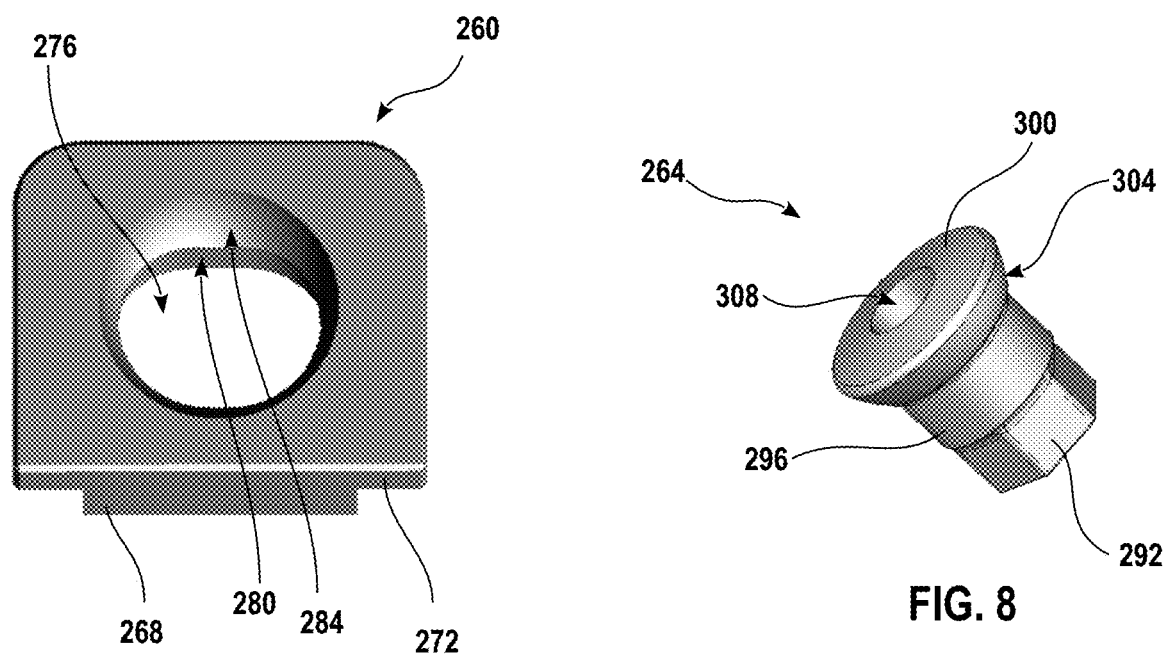
FIG. 7
FIG. 8

FORCE ABSORBING VEHICLE SEAT MOUNTING SYSTEM

CLAIM OF PRIORITY

This application claims the benefit of priority to U.S. Provisional Application No. 62/810,147, filed Feb. 25, 2019, the contents of which are incorporated herein by reference in their entirety.

FIELD

This disclosure relates generally to a seat mounting system, and more particularly a seat mounting system for a vehicle.

BACKGROUND

Vehicle seats are commonly mounted to the chassis of a vehicle with a rigid connection. However, racing vehicles and off-road vehicles are often driven on roads, tracks, or uneven surfaces at high speeds. Impacts from normal driving can be transferred by the rigid connection directly to the driver in the seat, which can cause injuries to the driver, particularly over long term exposure to the impacts.

Moreover, crashes can cause extreme impact forces, which are also transferred directly from the vehicle chassis to the driver via the rigid mounting arrangement. The large impact forces, particularly vertical forces transferred to the spinal column of the driver or passengers, can cause serious or fatal injuries to the driver or passengers.

As a result, there is a need for a vehicle seat mounting arrangement that reduces the transmission of impact forces from the vehicle chassis to the driver.

SUMMARY

In one embodiment, a vehicle seat mounting system for mounting a vehicle seat to a vehicle chassis comprises a first mounting arrangement with a first chassis attachment portion configured to attach to the vehicle chassis and a first seat attachment portion configured to attach to the vehicle seat. The first seat attachment portion is movable relative to the first chassis portion in at least one direction. The first mounting arrangement further includes a compressible member interposed between the first chassis attachment portion and the first seat attachment portion. The compressible member is configured to absorb impact forces between the vehicle chassis and the vehicle seat.

In another embodiment, a vehicle comprises a chassis, a vehicle seat, and a seat mounting system that mounts the vehicle seat to the chassis. The seat mounting system includes a first mounting arrangement comprising a first chassis attachment portion attached to the chassis, a first seat attachment portion attached to the vehicle seat, the first seat attachment portion being movable relative to the first chassis portion in at least one direction, and a compressible member interposed between the first chassis attachment portion and the first seat attachment portion, the compressible member configured to absorb impact forces between the chassis and the vehicle seat.

BRIEF DESCRIPTION OF THE DRAWINGS

FIG. 6 is a top cross-sectional view of the back mounting arrangement of FIG. 5.

FIG. 7 is a perspective view of a pivoting member of the back mounting arrangement of FIG. 5.

FIG. 8 is a top perspective view of a sliding member of the back mounting arrangement of FIG. 5.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

The terms "comprising," "including," "having," and the like, as used with respect to embodiments of the disclosure, are synonymous. As used herein, the term "approximately" is to be interpreted to encompass the range that one of ordinary skill in the art would consider reasonable in the context of the particular use of the term. Alternatively, the term "approximately" may be interpreted to include all values that are within ±10% of the reference value.

Figure 1:
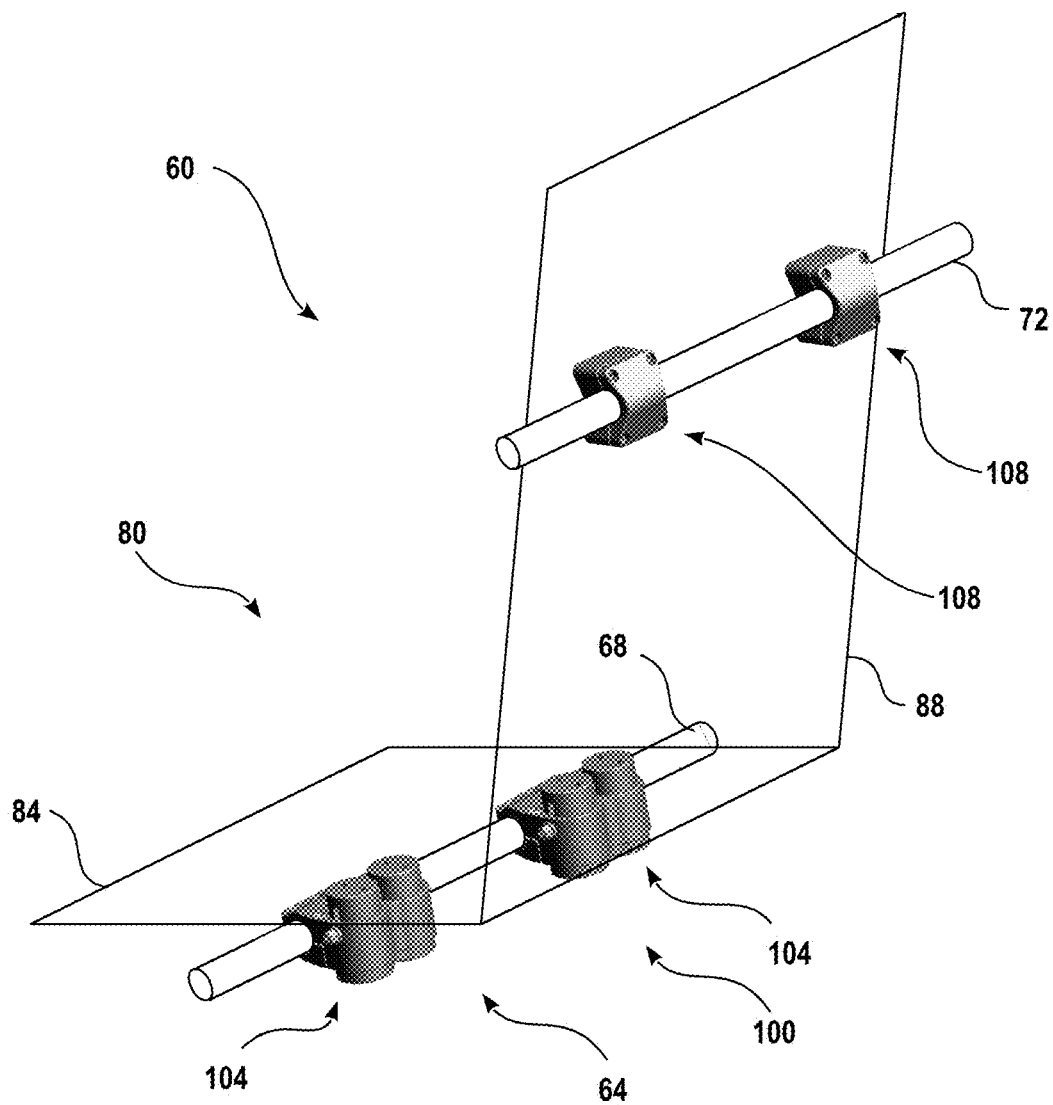
FIG. 1 is a schematic illustration of a vehicle seat mounted to a vehicle chassis using a mounting system according to the disclosure.

FIG. 1 illustrates a highly schematic view of a portion of a vehicle 60 that includes a chassis 64, the illustrated portion of which has a tubular base bars 68 and a tubular back bar 72, and a seat 80 having a seat base 84 and a seat back 88. The base and back bars 68, 72 of the chassis portion 64 may, in other embodiments, be configured in any suitable arrangement, for example running vertically, forward-backward, left-right, diagonally, or any other direction. Additionally, while the illustrated portion of the chassis 64 is formed by bars 68, 72, the reader should appreciate that the chassis 64 may be sheet metal portions, plates, brackets, or another suitable chassis portion. The vehicle may be, for example, a passenger vehicle, a race car, a motorcycle, an off-road vehicle, e.g. an all-terrain vehicle or a side-by-side, a snowmobile, a bus, a train, an airplane, a boat, or any other vehicle. In one particular embodiment, the vehicle 60 may be a race car, for example a sprint car, a midget car, a micro sprint car, a stock car (e.g. NASCAR), an open-wheel race car (e.g. IndyCar), a rally racing car, a drag-racing car, or the like.

The seat 80 is mounted to the chassis 64 by a mounting system 100 that reduces the transmission of impact forces from the chassis 64 to the seat 80. The mounting system 100 includes at least one base mounting arrangement 104, two of which are depicted in FIG. 1, and at least one back mounting arrangement 108, two of which are depicted in FIG. 1. The illustrated embodiment therefore provides a four-point mounting arrangement, which is required by some racing governing bodies. The reader should appreciate, however, that more or less base mounting arrangements 104 and back mounting arrangements 108 may be used in different embodiments depending on the configuration of the chassis 64 and the seat 80 being mounted to the chassis 64. Moreover, in some embodiments, no back mounting arrangements 108 are used, and the system includes only the base mounting arrangements 104. For example, in certain off-road vehicles, the seat may not have a back, or the back of the seat may not be independently mounted to the chassis. Likewise, in passenger cars, the back of the seat may not be mounted to the chassis.

Figure 2:
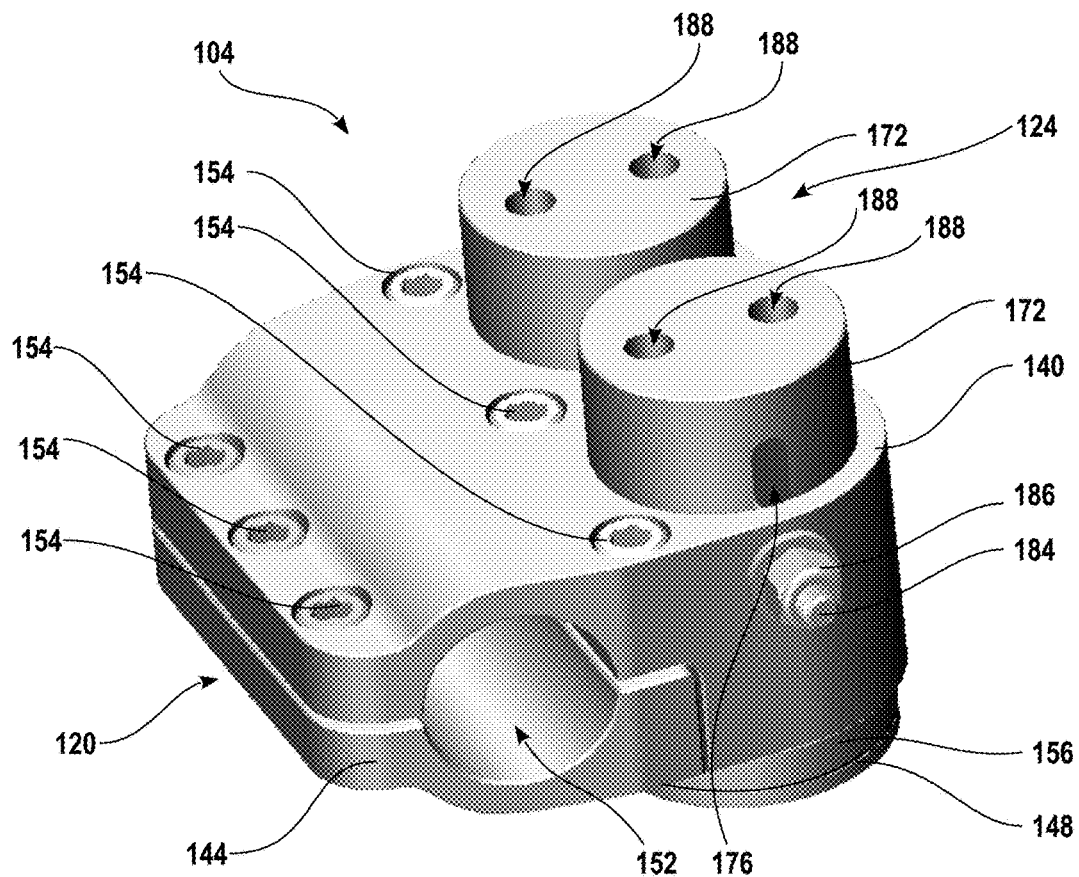
FIG. 2 is a perspective view of a base mounting arrangement of the mounting system of FIG. 1.
Figure 3:
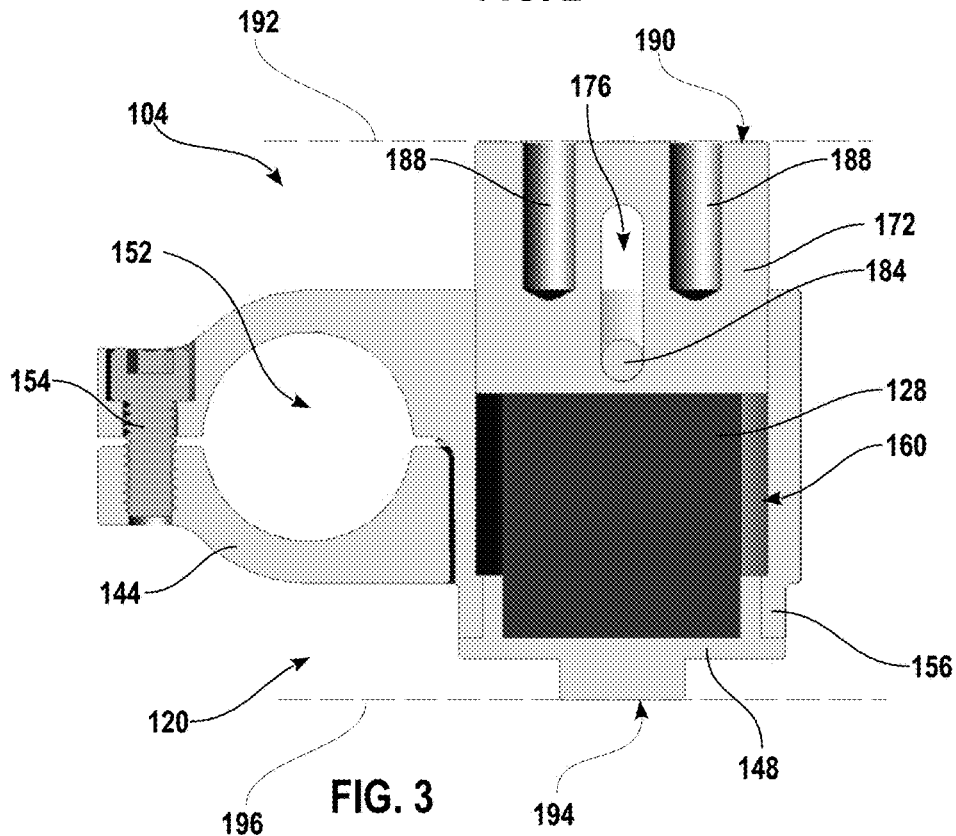
FIG. 3 is a side cross-sectional view of the base mounting arrangement of FIG. 2.
Figure 4:
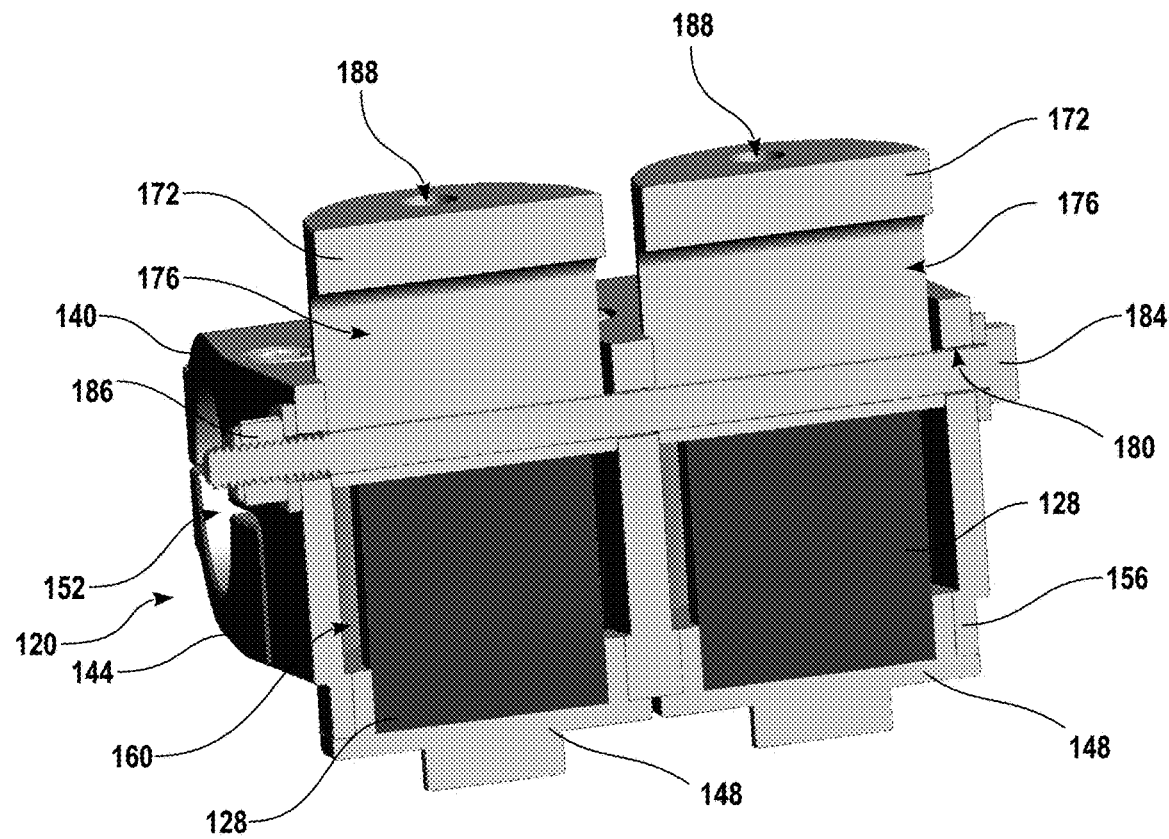
FIG. 4 is a perspective cross-sectional view of the base mounting arrangement of FIG. 2.

Referring now to FIGS. 2-4, the base mounting arrangement 104 includes a chassis attachment portion 120 fixedly connected either directly or indirectly to the chassis 64, a seat attachment portion 124 fixedly connected either directly or indirectly to the seat 80, and at least one compressible member 128 interposed between the chassis attachment portion 120 and the seat attachment portion 124. As will be discussed in detail below, the compressible members 128 are configured to absorb impact forces and reduce the transfer of impact forces from the chassis attachment portion 120 to the seat attachment portion 124, and thereby also reduce the transfer of impact forces from the chassis 64 to the seat 80.

The chassis attachment portion 120 includes a main body 140, a clamping body 144, and a chamber member 148. The main body 140 and the clamping body 144 jointly define a cylindrical opening 152 extending between the main body 140 and the clamping body 144. A plurality of fasteners 154 clamp the main body 140 and the clamping body 144 around the base bar 68 of the chassis 64 so as to fix the chassis attachment portion 120 to the chassis 64. The cylindrical opening 152 may have a diameter of, for example, approximately or exactly 1.125 inches, 1.5 inches, 2 inches, or any other suitable diameter depending on the diameter of the base bar 68 to which the base mounting arrangement 104 is designed to attach. The reader should appreciate, however, that in other embodiments, the chassis attachment portion 120 may be configured differently so as to accommodate different chassis configurations. For example, in one embodiment, the main body of the chassis attachment portion may be affixed directly to holes formed the chassis via fasteners, and the clamping body may be omitted.

The main body 140 includes a receiving boss 156, which projects downwardly and is configured to receive the chamber member 148. In the illustrated embodiment, the chassis attachment portion 120 includes two generally cylindrical chamber members 148, which are received in a receiving boss 156 that is in the shape of two cylinders that merge into one another. The chamber members 148 may be connected to the receiving boss 156 via a threaded connection, a welded connection, or another suitable connection.

Each of the chamber members 148, along with the main body 140, defines a chamber 160. In the illustrated embodiment, each of the chambers 160 is cylindrical, though the reader should appreciate that the chambers may have different shapes, for example square, rectangular, hexagonal, or another suitable shape. One compressible member 128 is arranged in each of the chambers 160 such that one end of the compressible member 128 abuts the respective chamber member 148. In some embodiments, the inner shape of the chamber members 148 may be complementary to the outer shape of the compressible members 128 so that the chamber members 148 restrain lateral movement of the compressible members 128 within the chambers 160.

The compressible members 128 may be formed of a compressible foam material, for example an open-cell foam, such as polyurethane foam, reticulated polyurethane foam, open cell nitrile foam, open cell EPDM foam, or a closed-cell foam such as EVA foam, polyethylene foam (EPE foam, XLPE foam), PVC foam rubber, neoprene foam rubber, SBR foam rubber, closed cell PVC/nitrile foam, closed cell EPDM foam rubber, and the like. The compressible foam may be, for example, resilient such that it returns to its original size after being compressed due to an impact, or it may be non-resilient such that the compressible foam does not return to its original size after compression. In another embodiment, the compressible members 128 are formed of a visco-elastic polymer such as Sorbothane®.

In many vehicles, particularly in off-road vehicles and race cars, the seat is mounted in a tight space. As a result, a vertically compact compressible member 128 is advantageous. However, reduced vertical height of the compressible member 128 can reduce the ability of the compressible member 128 to absorb impact forces. In some embodiments, therefore, the compressible foam may be high density foam, having a density of, for example, greater than 2.0 lb/ft$^3$, greater than 4.0 lb/ft$^3$, or greater than 8.0 lb/ft$^3$, so as to provide a high degree of impact absorption with a small height. In one particular embodiment, the compressible member 128 may have a thickness of less than approximately 1.5 inches, and in another embodiment, less than approximately 0.5 inches. In some embodiments, the compressible members 128 may remain rigid until a certain predetermined compression force threshold is reached. For instance, in one embodiment, the compression members 128 may remain rigid until a force of approximately 2000 N is applied to the mounting system 100, at which point the compression members 128 begin to deform and absorb the forces acting on the mounting system 100. The force absorption beyond the initial activation force of 2000 N may be, for example, linearly related to the compression force applied to the mounting system 100.

The seat attachment portion 124 includes one seat attachment member 172, formed as a piston arranged partially inside and protruding upwardly out of each chamber 160. The seat attachment members 172 each abut the end of the respective compressible member 128 opposite the chamber member 148. The outer circumferential surfaces of the seat attachment members 172 have a shape that is generally complementary to the inner surfaces of the chambers 160 so that the chambers 160 restrain the respective seat attachment member 172 from lateral movement. More specifically, in the illustrated embodiment, the seat attachment members 172 are cylindrically shaped and have an outer diameter that substantially corresponds (e.g. within approximately 0.01 inches) to the cylindrical shape and inner diameter of the chambers 160, though the reader should appreciate that the seat attachment members 172 may have different shapes that correspond to differently shaped chambers 160.

Each seat attachment member defines a slotted opening 176 that extends generally along a plane that is coincident with the longitudinal directions of the chambers 160 or, in the view of FIG. 3, in the vertical direction. The main body 140 defines a through hole 180 that coincides with the slotted openings 176. A bolt 184 extends through the through hole 180 and the slotted openings 176 and is secured in the through hole 180 by, for example, a nut 186. The bolt 184 has an outer diameter that corresponds to the inner diameter of the through hole so 180 such that the through hole 180 prevents movement of the bolt 184. As seen in FIG. 3, the slotted openings 176 have a width that generally corresponds to the diameter of the bolt 184, while allowing the seat attachment members 172 to move vertically, or in the longitudinal directions of the chambers, relative to the main body 140.

The seat attachment members 172 each define a plurality of threaded openings 188 extending into an upper surface of the seat attachment members 172. The threaded openings 188 are configured to receive threaded fasteners that pass through a hole in the seat base 84 of the vehicle seat 80. The threaded openings may be configured to receive, for example, M6, M8, ¼", 5/16", ⅜", or any other suitable size bolts. In the illustrated embodiment, each seat attachment member 172 includes two threaded openings 188, though the reader should appreciate that the configuration of the threaded openings may be different depending on the configuration of the seat 80 to which the base mounting arrangement 104 is configured to attach.

As a result of the generally complementary shape of the seat attachment members 172 and the chambers 160, and the arrangement of the bolt 184 through the slotted openings 176, the seat attachment members 172 have only one degree of freedom. As such, the seat attachment members 172 can move relative to the chassis attachment portion 120 only in the longitudinal direction of the chambers 160, thereby limiting undesirable lateral movement of the seat attachment members 172.

Additionally, as beset seen in FIG. 3, the top surface 190 of the seat attachment members 172 define a top plane 192 of the base mounting arrangement 104, while the bottom surface 194 of the chamber member 148 defines a bottom plane 196 of the base mounting arrangement 104. The entirety of the base mounting arrangement 104 is located between the top plane 192 and the bottom plane 196 or, in other words, no part of the main body 140 or the clamping body 144 extends above the top plane 192 or below the bottom plane 196. As a result, the base mounting arrangement is particularly compact in the vertical direction, allowing for the base mounting arrangement 104 to be used in mounting applications where there is minimal space available.

Figure 5:
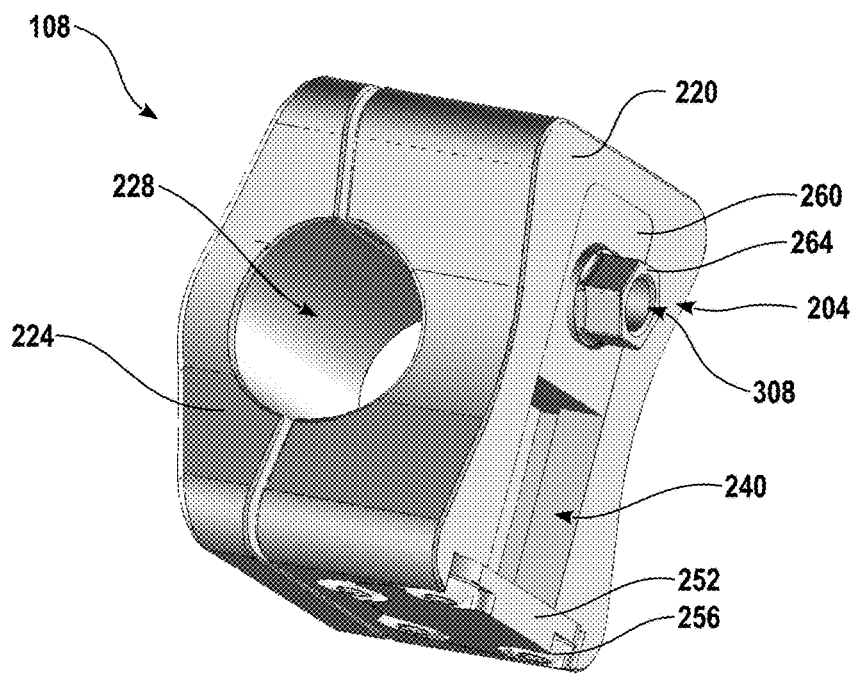
FIG. 5 is a perspective view of a back mounting arrangement of the mounting system of FIG. 1.

FIGS. 5 and 6 depict the back mounting arrangement 108 of the mounting system 100. The back mounting arrangement 108 includes a back chassis attachment portion 200 and a back seat attachment portion 204. The back chassis attachment portion 200 has a housing body 220 and a clamping member 224, which jointly define a cylindrical opening 228. A plurality of fasteners 232 clamp the housing body 220 and the clamping member 224 with the cylindrical opening 228 around the back bar 72 of the chassis 64, so as to securely clamp the back chassis attachment portion 200 to the back bar 72. The reader should appreciate, however, that the back chassis attachment portion 200 may be configured differently to attach to a variety of different vehicle chassis. For example, in one embodiment, the housing body 220 of the back chassis attachment portion 200 may be configured to attach directly to the chassis, and the clamping member may therefore be dispensed with.

At a side of the housing body 220 opposite the clamping member 224, the housing body 220 defines a stepped channel 240 that extends in a direction that is generally perpendicular to the longitudinal axis of the cylindrical opening 228. The reader should appreciate, however, that the alignment between the stepped channel 240 and the cylindrical opening may vary to accommodate different configurations of chassis and seats. The stepped channel 240 has a first portion 244, extending in from the surface of the housing body 220, and a second portion 248 located deeper into the housing body 220. The second portion 248 and has a greater width than the first portion 244, such that the stepped channel 240 is generally T-shaped. In one embodiment, for example, the first portion 244 may have a width of approximately 1 inch, while the second portion 248 may have a width of approximately 1.5 inches.

The stepped channel 240 is open at one longitudinal end thereof to enable the seat attachment portion 204 to slide into the stepped channel 240. Once the seat attachment portion 204 is arranged in the stepped channel 240, the stepped channel 240 is closed off with a housing cap 252, which is secured to the housing body 220 by a plurality of fasteners 256, for example bolts or screws, so as to retain the seat attachment portion 204 in the stepped channel 240.

The seat attachment portion 204 includes a sliding member 260 and a pivoting member 264, which is pivotably positioned in the sliding member 260. With particular reference now to FIG. 7, and continuing reference to FIGS. 5 and 6, the sliding member 260 has a first portion 268 and a second portion 272. The first portion 268 of the sliding member 260 has a width that substantially corresponds to the width of the first portion 244 of the stepped channel 240, while the second portion 272 has a width that substantially corresponds to the width of the second portion 248 of the stepped channel 240. More particularly, the widths of the first and second portions 268, 272 of the sliding member 260 may be approximately 0.01 inches less than the widths of the respective first and second portions 244, 248 of the stepped channel 240 so that the sliding member 260 is restrained in the stepped channel 240 but allowed to slide along the longitudinal direction of the stepped channel 240.

A through hole 276 is defined through the sliding member 260 extending from the outer surface of the sliding member 260 to the inner surface thereof. In the first portion 268, the through hole 276 is shaped as a slotted hole 280, having a length that is greater than its width. The length direction of the slotted hole 280 is, in one particular embodiment, perpendicular to the longitudinal direction of the stepped channel 240 or, in other words, left to right in the view of FIG. 6. In the second portion 272 of the sliding member 260, the through hole 276 is defined by a concave spherical surface 284.

Referring now to FIG. 8, and with continuing reference to FIGS. 5 and 6, the pivoting member 264 includes a hexagonal portion 292, an intermediate portion 296, and a head portion 300. The pivoting member 264 is arranged within the through hole 276 such that the hexagonal portion 292 extends beyond the outer surfaces of the sliding member 260 and the housing body 220.

As is best seen in FIG. 6, the intermediate portion 296 is positioned in the elongated portion 280 of the through hole 276. The intermediate portion 296 has a diameter that substantially corresponds to the width of the elongated portion 280 such that the elongated portion 280 restrains movement of the intermediate portion 296 along the width direction of the elongated portion 280, which is the vertical direction in the view of FIG. 5. The length of the elongated portion 280, however, is greater than the diameter of the intermediate portion 296 of the pivoting member 262, thereby allowing the intermediate portion 296 to move in the length direction of the elongated portion 280, which is the horizontal direction in the view of FIG. 5.

With continuing reference to FIG. 6, and further reference to FIGS. 7 and 8, the head portion 300 has a convex spherical surface 304 that substantially corresponds to the concave spherical surface 284 of the sliding member 260. In one embodiment, for example, the diameter of the convex spherical surface 304 may be approximately or exactly 0.0025 inches less than the diameter of the concave spherical surface 284, thereby allowing the head portion 300 to pivot relative to the sliding member 260 while maintaining contact between the concave and convex spherical surfaces 284, 304.

An opening 308 extends centrally through the pivoting member 264 along the axial direction of the pivoting member 264. The opening 308 is internally threaded along at least a portion thereof, thus enabling the pivoting member 264 to receive a fastener (not shown) that connects the back seat attachment portion 204 to the seat back 88 of the seat 80. The opening 308 may, for example, be sized so as to receive an M6, M8, ¼", ⁵⁄₁₆", ⅜", or any other suitable size bolt. In one particular embodiment, the opening 308 is threaded through the entirety of the hexagonal portion 292 and intermediate portion 296, and through at least a majority of the head portion 300. The reader should appreciate that, while the opening 308 extends entirely though the pivoting member 264 in the illustrated embodiment, in other embodiments the opening 308 may be a blind hole extending into the pivoting member 264 from the hexagonal portion 292 that does not extend entirely through the pivoting member 264.

Figure 9:
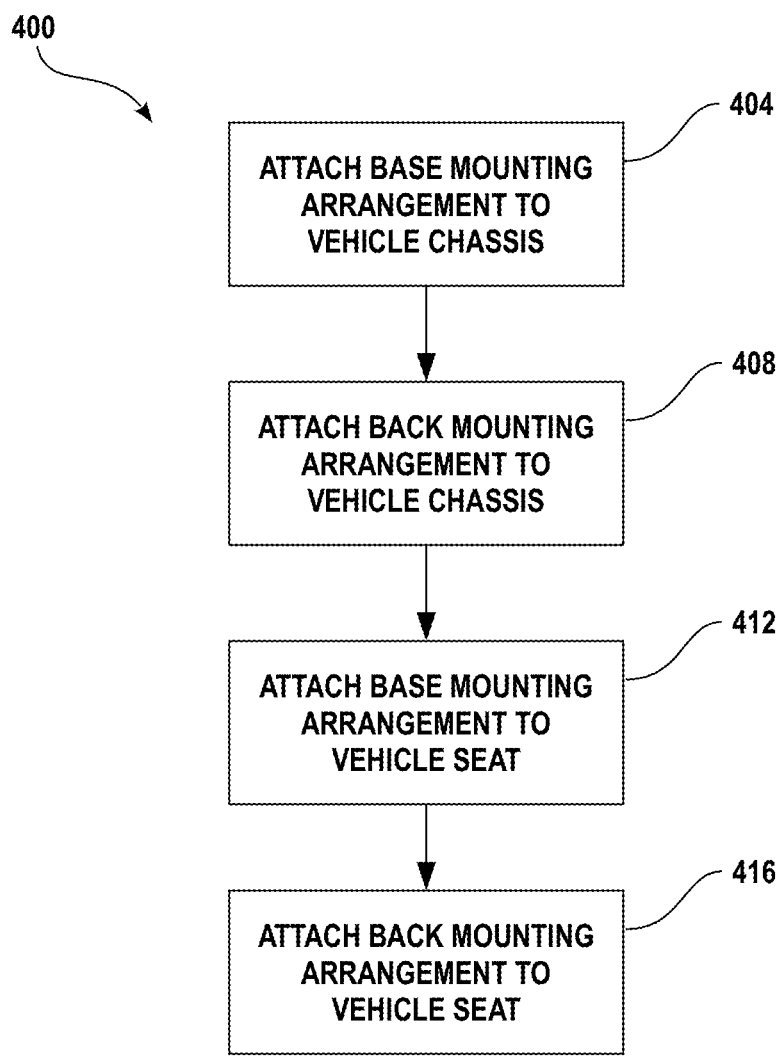
FIG. 9 is a process diagram of a process for mounting a vehicle seat to a vehicle chassis with the mounting system of FIG. 1.

FIG. 9 illustrates a process diagram of a process 400 for installing the seat 80 in the vehicle using the mounting system 100. The reader should appreciate that the process 400 is not limited to the order of the steps depicted in FIG. 9, and the steps of the process 400 may in fact be performed in any desired order.

The process 400 includes attaching the base mounting arrangement 104 to the chassis 64 (block 404). In one embodiment, the main body 140 and the clamping body 144 are both positioned around the base bar 68 such that base bar 68 extends through the cylindrical opening 152 of the base mounting arrangement 104. The base mounting arrangement 104 is arranged such that the longitudinal axes of the chambers 160, and therefore the compressible members 128 and seat attachment members 172, extend generally vertically, for example at an angle of less than 15 degrees relative to vertical, or more particularly at an angle of less than 5 degrees relative to vertical. The fasteners 154 are then inserted to connect the main body 140 to the clamping body 144, and tightened to clamp the base bar 68 between the main body 140 and the clamping body 144. The attachment of the base mounting arrangement 104 may be repeated as many times as desired to install additional base mounting arrangements 104 to the chassis 64.

The process 400 further includes attaching the back mounting arrangement 108 to the chassis 64 (block 408). More particularly, the housing body 220 and the clamping member 224 are arranged around the back bar 72 such that the back bar 72 extends through the cylindrical opening 228. The back mounting arrangement 108 is arranged such that the lengthwise direction of the stepped channel 240 is substantially vertical, for example at an angle of less than 30 degrees relative to vertical. In one particular embodiment, the back mounting arrangement 108 may be installed such that the lengthwise direction of the stepped channel 240 is less than approximately 10 degrees relative to vertical, while in another embodiment the stepped channel 240 may be vertical. The fasteners 232 are then inserted to clamp the clamping member 224 to the housing body 220, and tightened to clamp the back bar 72 in the cylindrical opening 228 between the housing body 220 and the clamping member 224. The attaching of the back mounting arrangement 108 may be repeated as many times as desired to install additional back mounting arrangements 108 to the chassis 64.

The base mounting arrangement 104 is also attached to the seat 80 in the process 400 (block 412). In one particular embodiment, a threaded fastener is inserted through a hole (not shown) in the seat base 84 and into each threaded opening 188 of the seat attachment portion 124 of the base mounting arrangement 104, thereby securing the seat base 84 to the base mounting arrangement 104. The attachment of the base mounting arrangement 104 to the seat 80 may be repeated as desired to install additional base mounting arrangements 104 to the seat 80.

The process 400 further includes attaching the back mounting arrangement 108 to the seat 80 (block 416). In one embodiment, this includes arranging the pivoting member 264 in the through hole 276 of the sliding member 260 so as to form the back seat attachment portion 204. The sliding member 260, along with the pivoting member 264, is arranged in the stepped channel 240. The open end of the stepped channel 240 is then closed with the housing cap 252, and the fasteners 256 are inserted to secure the housing cap 252 to the housing body 220. A fastener, for example a screw or bolt, is inserted through a hole (not shown) in the seat back 88 into the opening 308 of the pivoting member 264 and then secured into the threads of the opening 308, thereby securing the seat back 88 to the back seat attachment portion 204 of the back mounting arrangement 108. The attaching of the back mounting arrangement 108 to the seat 80 may be repeated as desired to install additional back mounting arrangements 108.

Additionally, as discussed above, the mounting system 100 may, in some embodiments, only include the base mounting arrangements 104, and not include any back mounting arrangements. In such embodiments, the attaching of the back mounting arrangements to the chassis (block 408) and the attachment of the back mounting arrangements to the seat (block 416) are omitted.

Once installed, as depicted in FIG. 1, the mounting system 100 reduces the transmission of impact forces between the vehicle chassis 64 and the seat 80. When the vehicle 60 encounters an impact, for example from hitting a bump or impacting another object, the impact force causes the chassis 64 to move vertically upwardly very rapidly. At the base of the chassis 64, the impact force is transmitted from the base bar 68 of the chassis 64 to the main body 140 (FIGS. 2-4) of the chassis attachment portion 120 of the base mounting arrangement 104, and then to the chamber member 148. The chamber member 148 therefore moves vertically upwardly against the compressible member 128.

As the compressible member 128 is subjected to the impact force, the bolt 184 moves within the slotted openings 176 and the chassis attachment portion 120 moves upwardly relative to the seat attachment portion 124, thereby compressing the compressible member 128 between the chamber member 148 and the seat attachment members 172. The impact force is transmitted from the compressible member 128 to the seat attachment members 172 during this compression and, if the compressible member 128 is resilient, the subsequent resilient expansion of the compressible member 128. Since the compression of the compressible member 128 occurs over a longer period of time than the impact force acting on the chassis attachment portion 120, the impact force is transmitted to the seat attachment members 172 over a relatively longer period of time. As a result, the maximum magnitude of the impact force transmitted to the seat attachment portion 124, and therefore the seat base 84, is less than the impact force acting on the chassis 64.

At the same time, as can be seen in FIG. 1, the impact force acts on the back bar 72 of the chassis 64. The back chassis attachment portion 200 (FIGS. 5 and 6) of the back mounting arrangement 108 is therefore subjected to the impact force via the interaction between the back bar 72 and the cylindrical opening 228. The back chassis attachment portion 200 thus moves vertically as a result of the impact force. The compression of the compressible members 128 causes the seat 80, including the seat back 88, to move at a slower rate than the chassis 64, and therefore the back chassis attachment portion 200. The housing body 220, and therefore the stepped channel 240, thus moves upwardly faster than the sliding member 260, which is free to slide within the stepped channel 240 to compensate for this difference in vertical movement.

As the stepped channel 240 moves relative to the sliding member 260, the lateral angle between the fastener connecting the seat back 88 to the pivoting member 264 may change. The pivoting member 264 pivots relative to the sliding member 260 along the interface between the concave and convex spherical surfaces 284, 304. The intermediate portion 296 of the pivoting member 264 pivots within the elongated portion 280 of the through hole 276 in the sliding member 260, thereby allowing the pivoting member 264 to pivot laterally relative to the sliding member 260. As a result, the fastener connected to the pivoting member 264 can move with the seat back 88 to compensate for any change in the lateral angle between the back bar 72 of the chassis 64 and the seat back 88.

With a conventional rigid seat mounting arrangement, the impact force is transmitted directly from the chassis to the seat. As a result, the seat bottom moves upwardly at the same rate as the chassis during the vertical impact force, thereby transferring the impact force directly into upward movement of the driver or passenger in the seat. Consequently, conventional rigid seat mounting arrangements, the impact force acts directly on the spine of the driver or passenger, causing compression of the spine. Thoracic and lumbar fractures can occur in the spinal cord with compressive forces of as low as 3 G's (approximately 2175 Newtons), while 5 G's of compression acting on the spine is likely to cause severe injury or death.

The compressible members 128 allow the seat attachment portion 124 of the seat mounting system 100, however, to move relative to the chassis attachment portion 120 during an impact. As such, the compressible members 128 compress and increase the time over which the impact force is transmitted from the chassis attachment portion 120 and back chassis attachment portion 200 to the seat attachment portion 124 and back seat attachment portion 204, thereby absorbing part of the impact force by reducing the magnitude of the force transmitted from the chassis 64 to the seat 80 during an impact. Accordingly, the driver or passenger in the seat 80 experiences a reduced vertical impact force, which decreases the compression force acting on the driver or passenger's spine. For instance, one particular embodiment of the mounting system 100 has been shown to absorb approximately 3000 N of vertical force during an impact. Consequently, the mounting system 100 reduces the likelihood of the driver or passenger in the seat 80 experiencing a spinal injury from the impact.

Moreover, in embodiments in which the seat must be mounted in a very tight space, the compressible members may be a high-density compressible material, for example foam or Sorbothane®, that has a small vertical height. The high-density compressible material can absorb large forces while occupying a compact volume, thereby allowing for the base mounting arrangement 104 to be used in many applications, such as, for example, race cars and off-road vehicles. Moreover, since the cylindrical opening 152 and the chambers 160 in which the compressible members 128 are arranged laterally adjacent to one another such that the main body 140 does not extend above the seat attachment members 172 or below the chamber member 148, the overall vertical height of the base mounting arrangement 104 is advantageously small.

In particular, the entire vertical height of the base mounting arrangement 104 may be less than approximately 2.5 inches, less than approximately 2.0 inches, or less than approximately 1.5 inches in various embodiments.

Figure 10:
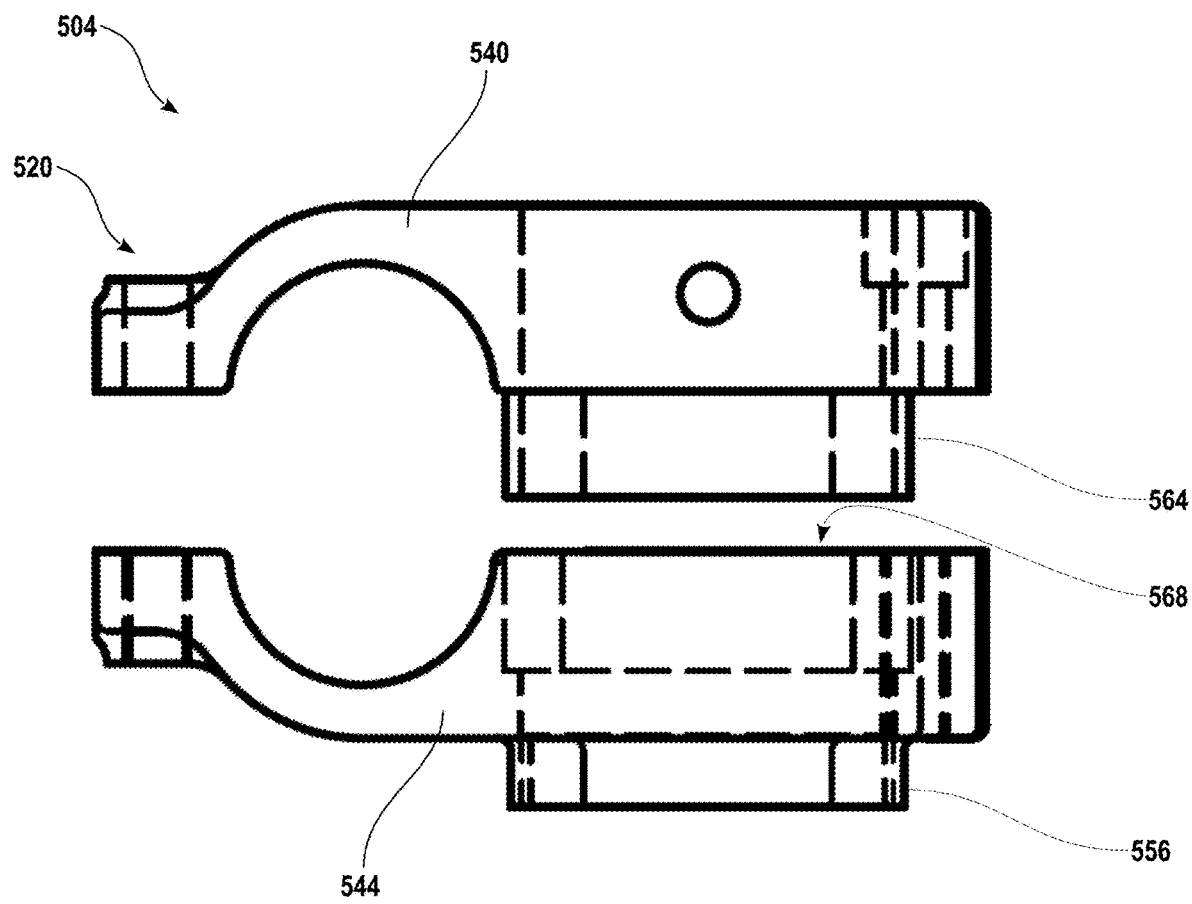
FIG. 10 is a partially exploded view of a portion of a base mounting arrangement of the mounting system of FIG. 1.

FIG. 10 depicts another base mounting arrangement 504 having a chassis attachment portion 520 with a main body 540 and a clamping body 544 that jointly define cylindrical chambers 560 in which the compressible members (not shown in FIG. 10) are arranged. The main body 540 includes a chamber projection 564 that extends downwardly into a recess 568 defined in the clamping body 544 so as to align the main body 540 with the clamping body 544.

The clamping body 544 defines a receiving boss 156, which receives the chamber member (not shown in FIG. 10) in a manner similar as in the embodiment described above. The seat attachment portions and compressible members are configured substantially identical to the embodiment of FIGS. 1-4 described above.

Figure 11:
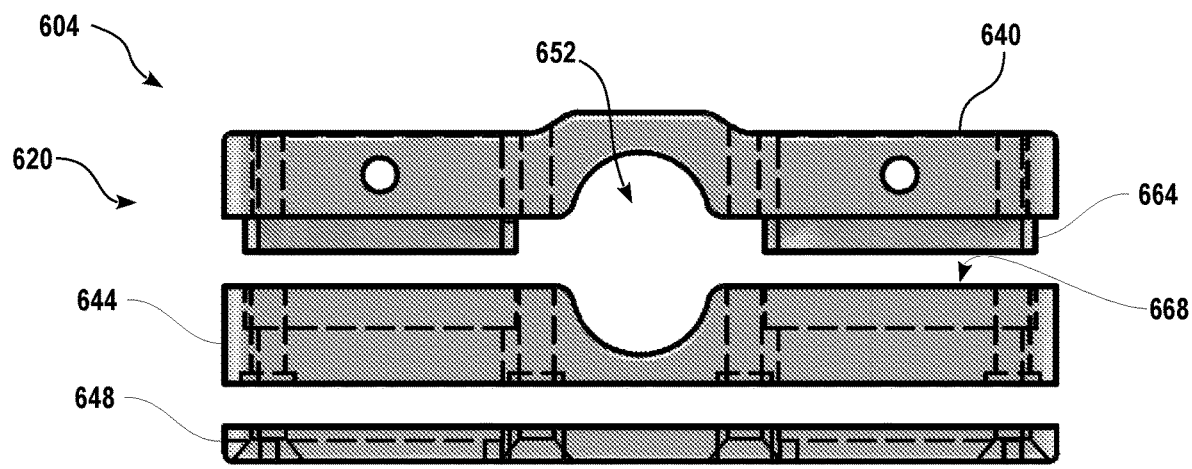
FIG. 11 is a partially exploded view of a portion of a base mounting arrangement of the mounting system of FIG. 1.
Figure 12:
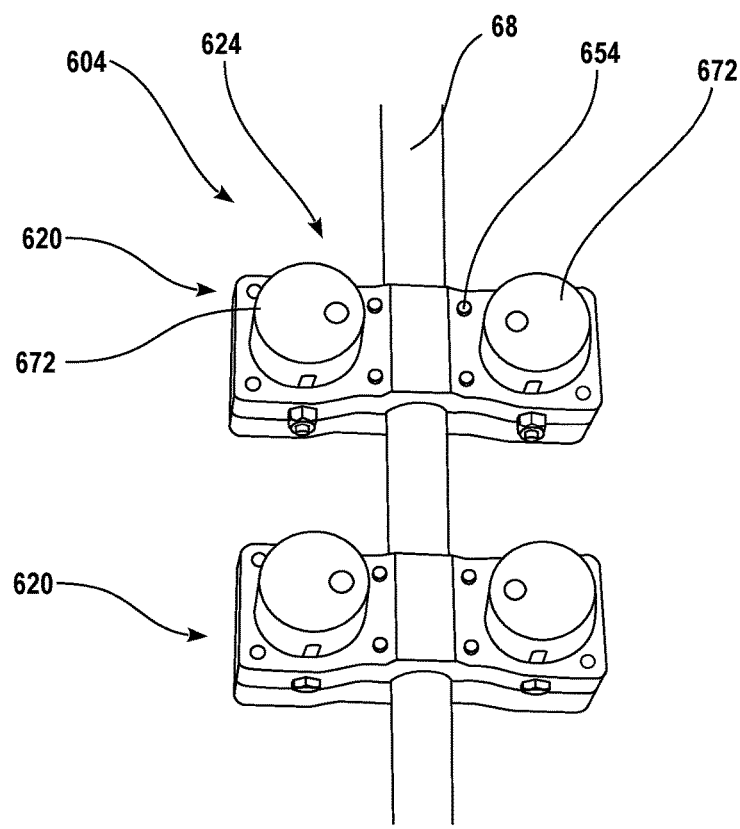
FIG. 12 is a top view of the base mounting arrangement of FIG. 11 installed on a base bar of a vehicle chassis.

FIGS. 11-12 illustrate another base mounting arrangement 604 in which the cylindrical opening 652 is arranged in the center, between the two seat attachment members 672. Similar to the embodiment of FIG. 10, the main body 640 includes two chamber projections 664, each of which is received in a recess 668 defined in the clamping body 644 so as to align the main body 640 and the clamping body 644.

A chamber member 648 has a similar profile as the clamping body 644 and the main body 640. The main body 640, clamping body 644, and chamber member 648 are connected to one another by fasteners 654 that extend from the chamber member 648, through the clamping body 644, and into the main body 640. The remainder of the base mounting arrangement 604 is generally the same as the embodiment of FIGS. 2-4 described above.

In the embodiment of FIGS. 11 and 12, therefore, the seat attachment portion 624 of the base mounting arrangement 604 includes one seat attachment member 172 on either side of the base bar 68 of the chassis. As a result, the force moments acting on the opposing sides of the base mounting arrangement 604 generally cancel out, thereby advantageously resulting in a particularly stable base mounting arrangement 604.

Figure 13:
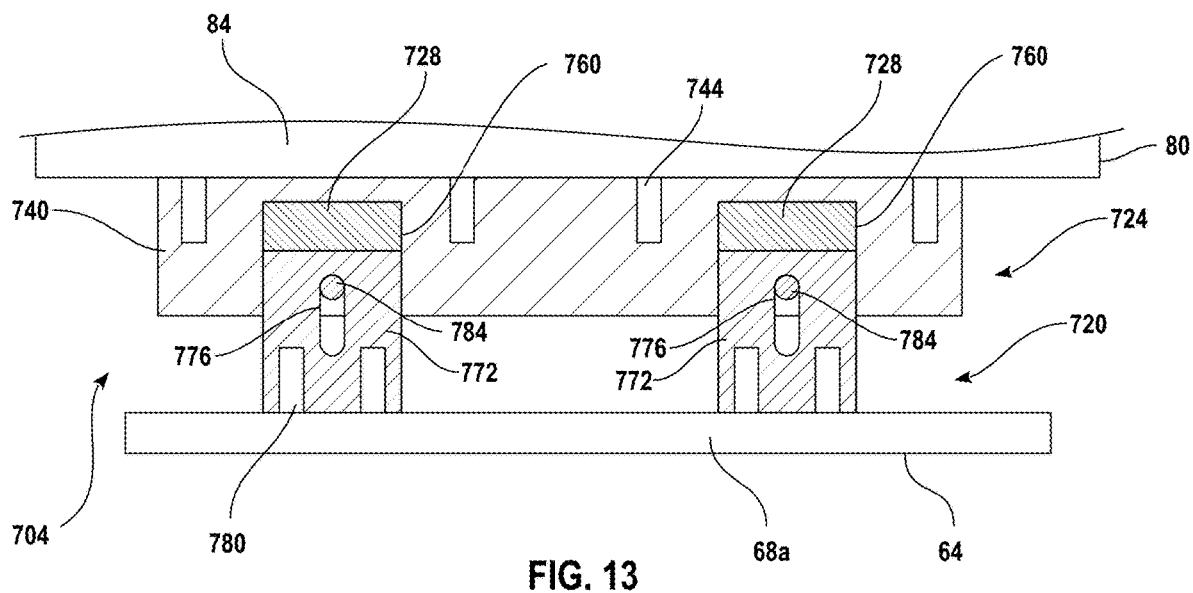
FIG. 13 is a cross-sectional view of a base mounting arrangement of the mounting system of FIG. 1.

FIG. 13 depicts another embodiment of a base mounting arrangement 704 for mounting the base of a vehicle seat 80 to the chassis 64. The base mounting arrangement 704 includes a chassis attachment portion 720 and a seat attachment portion 724. As in the embodiments above, one or more compressible members 728 are interposed between the chassis attachment portion 720 and the seat attachment portion 724.

The seat attachment portion 724 includes a main body 740, which is fixedly connected to the seat base 84 of the seat 80 via fasteners (not shown) inserted through openings in the seat base 84 and into threaded openings 744 defined in the upper surface of the main body 740. In the embodiment of FIG. 13, the main body 740 of the seat attachment portion 724 defines at least one chamber 760, two of which are depicted in FIG. 13. The chambers 760 may be, for example, cylindrical, rectangular, square, oval-shaped, or any other desired shape. In one particular embodiment, the chambers 760 are formed as blind bores extending upwardly partially into the main body 740.

One compressible member 728 is positioned in each of the chambers 760. The compressible members 728 may be, for example, any of the compressible materials described above in the previous embodiments. In one particular embodiment, the compressible members 728 are resiliently compressible, and may be formed of, for example, Sorbothane®.

The chassis attachment portion 720 includes one chassis attachment member 772 arranged at least partially in each of the chambers 760 and extending downwardly out of the respective chamber 760. The chassis attachment members 772 are formed with a complementary size, shape, and/or diameter with respect to the respective chamber 760. The chassis attachment members 772 may, in some embodiments, be formed similarly or identically to the seat attachment members 172 described above with reference to the embodiment of FIGS. 2-4.

The chassis attachment members 772 each define a slotted opening 776 extending generally along the longitudinal direction of the chambers 760 or, in other words, generally in the vertical direction in the orientation depicted in FIG. 13. Bolts 784 extend through corresponding through holes in the main body 740 in a manner similar to the bolt 184 illustrated above, and through the slotted openings 776. The bolts 784 allow for the chassis attachment members 772 to move about the bolt 784 along the direction of the slotted opening relative to the main body 740.

Each chassis attachment member 772 defines at least one threaded opening, via which the chassis attachment member 772 is fixedly connected to the chassis 64 by fasteners (not shown). In the embodiment of FIG. 14, chassis attachment members are attached to a base bracket 68*a* of the chassis 64.

In the embodiment depicted in FIG. 13, the base mounting arrangement 704 includes two chambers 760, two compressible members 728, and chassis seat attachment members 772.

The reader should appreciate, however, that the base mounting member may include any desired number of chambers 760, compressible members 728, and chassis attachment members 772. For example, in another particular embodiment, the base mounting arrangement 704 includes eight chambers, compressible members, and chassis attachment members.

The base mounting arrangement 704 has a vertical height that is less than approximately 3 inches. In one particular embodiment, the vertical height of the base mounting arrangement 704 is less than approximately 2 inches. In another embodiment, the vertical height of the base mounting arrangement 704 may be less than approximately 1.5 inches.

The base mounting arrangement 704 functions in a similar manner as the base mounting arrangement 104 described above. In particular, the chassis attachment members 772 of the chassis attachment portion 720 are fixed relative to the chassis 64, while the seat attachment portion 724, and therefore the seat 80, is vertically movable relative to the chassis 64. The compressible members 728 therefore function in a similar manner as described above to absorb impact forces acting on the chassis and reduce the magnitude of impact forces transferred to the driver or passenger in the seat 80.

The base mounting arrangement 704 is configured such that the chambers 760 face downwardly when mounted. As a result, any water, mud, or other contaminants naturally drain downwardly out of the chambers 760 under the force of gravity. As such, the base mounting arrangement 704 is particularly advantageous for off-road vehicles and other vehicles in which the seat mounting system may be subjected to water, mud, or other contaminants.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A vehicle seat mounting system for mounting a vehicle seat to a vehicle chassis, the arrangement comprising:
   a first mounting arrangement comprising:
   a first chassis attachment portion configured to fixedly connect to the vehicle chassis;
   a first seat attachment portion configured to fixedly connect to the vehicle seat, the first seat attachment portion being movable relative to the first chassis portion in at least one direction; and
   a compressible member interposed between the first chassis attachment portion and the first seat attachment portion, the compressible member configured to absorb impact forces between the vehicle chassis and the vehicle seat, wherein:
   one of the first chassis attachment portion and the first seat attachment portion includes a main body that defines a chamber in which the compressible member is arranged,
   the other of the first chassis attachment portion and the first seat attachment portion includes an attachment member at least partially arranged in the chamber, and
   the compressible member is formed of a compressible foam material.

2. The vehicle seat mounting system of claim 1, wherein:
   the attachment member defines at least one slotted opening extending along the at least one direction, and a bolt is fixedly connected to the main body, the bolt extending through the at least one slotted opening so as to allow movement of the attachment member only in the at least one direction.

3. A vehicle seat mounting system for mounting a vehicle seat to a vehicle chassis, the arrangement comprising:
   a first mounting arrangement comprising:
   a first chassis attachment portion configured to fixedly connect to the vehicle chassis:
   a first seat attachment portion configured to fixedly connect to the vehicle seat, the first seat attachment portion being movable relative to the first chassis portion in at least one direction; and
   a compressible member interposed between the first chassis attachment portion and the first seat attachment portion, the compressible member configured to absorb impact forces between the vehicle chassis and the vehicle seat, wherein:

one of the first chassis attachment portion and the first seat attachment portion includes a main body that defines a chamber in which the compressible member is arranged, and the other of the first chassis attachment portion and the first seat attachment portion includes an attachment member at least partially arranged in the chamber; and a second mounting arrangement comprising:
a second chassis attachment portion configured to attach to the vehicle chassis; and
a second seat attachment portion configured to attach to the vehicle seat, the second seat attachment portion being movable relative to the second chassis attachment portion along the at least one direction.

4. A vehicle seat mounting system for mounting a vehicle seat to a vehicle chassis, the arrangement comprising:
a first mounting arrangement comprising:
a first chassis attachment portion configured to fixedly connect to the vehicle chassis;
a first seat attachment portion configured to fixedly connect to the vehicle seat, the first seat attachment portion being movable relative to the first chassis portion in at least one direction; and
a compressible member interposed between the first chassis attachment portion and the first seat attachment portion, the compressible member configured to absorb impact forces between the vehicle chassis and the vehicle seat, wherein:
one of the first chassis attachment portion and the first seat attachment portion includes a main body that defines a chamber in which the compressible member is arranged,
the other of the first chassis attachment portion and the first seat attachment portion includes an attachment member at least partially arranged in the chamber,
the attachment member defines at least one slotted opening extending along the at least one direction,
a bolt is fixedly connected to the main body, the bolt extending through the at least one slotted opening so as to allow movement of the attachment member only in the at least one direction, and
the compressible member is formed of a visco-elastic polymer material.

5. The vehicle seat mounting system of claim 3, wherein the compressible member is formed of a compressible foam material.

6. The vehicle seat mounting system of claim 3, wherein the first mounting arrangement is configured to mount to a base portion of the vehicle seat, and the second mounting arrangement is configured to mount to a back portion of the vehicle seat.

7. The vehicle seat mounting system of claim 6, wherein the second chassis attachment portion defines a channel extending at least substantially in the at least one direction, and the second seat attachment portion is arranged at least partially in the channel so as to be movable within the channel.

8. The vehicle seat mounting system of claim 7, wherein the second seat attachment portion includes a sliding member arranged in the channel and a pivoting member that is operably connected to and pivotable relative to the sliding member, the pivoting member configured to attach to the back portion of the vehicle seat.

9. The vehicle seat mounting system of claim 8, wherein the sliding member includes a concave spherical surface that partially defines a through hole in which the pivoting member is positioned, the pivoting member including a convex spherical surface that engages the concave spherical surface.

10. The vehicle seat mounting system of claim 9, wherein the concave spherical surface has a diameter that generally corresponds to a diameter of the convex spherical surface.

11. The vehicle seat mounting system of claim 10, wherein the through hole includes a cylindrical portion adjacent to the head portion, and the through hole includes an elongated portion defined by the sliding member, the elongated portion having a width that generally corresponds to a diameter of the cylindrical portion, and a length that is greater than the width.

12. A vehicle comprising:
a chassis;
a vehicle seat; and
a seat mounting system that mounts the vehicle seat to the chassis, the seat mounting system comprising:
a first mounting arrangement comprising:
a first chassis attachment portion fixedly connected to the chassis;
a first seat attachment portion fixedly connected to the vehicle seat, the first seat attachment portion being movable relative to the first chassis portion in at least one direction; and
a compressible member interposed between the first chassis attachment portion and the first seat attachment portion, the compressible member configured to absorb impact forces between the chassis and the vehicle seat, wherein:
one of the first chassis attachment portion and the first seat attachment portion includes a main body that defines a chamber in which the compressible member is arranged,
the other of the first chassis attachment portion and the first seat attachment portion includes an attachment member at least partially arranged in the chamber, and
the compressible member is formed of a compressible foam material.

13. The vehicle of claim 12, wherein:
the attachment member defines at least one slotted opening extending along the at least one direction, and
a bolt is fixedly connected to the main body, the bolt extending through the at least one slotted opening so as to allow movement of the attachment member relative to the main body only in the at least one direction.

14. A vehicle comprising:
a chassis;
a vehicle seat; and
a seat mounting system that mounts the vehicle seat to the chassis, the seat mounting system comprising:
a first mounting arrangement comprising:
a first chassis attachment portion fixedly connected to the chassis;
a first seat attachment portion fixedly connected to the vehicle seat, the first seat attachment portion being movable relative to the first chassis portion in at least one direction; and
a compressible member interposed between the first chassis attachment portion and the first seat attachment portion, the compressible member configured to absorb impact forces between the chassis and the vehicle seat, wherein:
one of the first chassis attachment portion and the first seat attachment portion includes a main body that defines a chamber in which the compressible member is arranged, the other of the first chassis attachment portion and the first seat attachment portion includes an attachment member at least partially arranged in the chamber; and
a second mounting arrangement comprising:
   a second chassis attachment portion attached to the chassis; and
   a second seat attachment portion attached to the vehicle seat, the second seat attachment portion being movable relative to the second chassis attachment portion along the at least one direction,
wherein the vehicle seat has a base portion and a back portion and the first mounting arrangement is attached to the base portion and the second mounting arrangement is attached to the back portion.

15. The vehicle of claim 14, wherein:
the second chassis attachment portion defines a channel extending at least substantially in the at least one direction, and the second seat attachment portion is arranged at least partially in the channel so as to be movable within the channel,
the second seat attachment portion includes a sliding member arranged in the channel and a pivoting member that is operably connected to and pivotable relative to the sliding member, the pivoting member being attached to the back portion of the vehicle seat.

16. The vehicle of claim 15, wherein:
the sliding member includes a concave spherical surface that partially defines a through hole in which the pivoting member is positioned, the pivoting member including a convex spherical surface that engages the concave spherical surface,
the concave spherical surface has a diameter that generally corresponds to a diameter of the convex spherical surface, and
the through hole includes a cylindrical portion adjacent to the head portion, and the through hole includes an elongated portion defined by the sliding member, the elongated portion having a width that generally corresponds to a diameter of the cylindrical portion, and a length that is greater than the width.

17. The vehicle seat mounting system of claim 1, wherein the compressible foam material is a non-resilient foam.

18. The vehicle seat mounting system of claim 1, wherein the compressible foam material is a closed-cell foam.

19. The vehicle seat mounting system of claim 1, wherein the compressible member is configured to remain rigid until a force applied to the compressible member exceeds a predetermined compression force threshold.

20. The vehicle seat mounting system of claim 3, wherein:
   the attachment member defines at least one slotted opening extending along the at least one direction, and
   a bolt is fixedly connected to the main body, the bolt extending through the at least one slotted opening so as to allow movement of the attachment member only in the at least one direction.

* * * * *